(12) United States Patent
Wang et al.

(10) Patent No.: US 10,869,147 B2
(45) Date of Patent: Dec. 15, 2020

(54) SOUND DEVICE AND ASSEMBLING METHOD THEREFOR

(71) Applicant: AAC ACOUSTIC TECHNOLOGIES (SHENZHEN) CO., LTD., Shenzhen (CN)

(72) Inventors: Chengliang Wang, Shenzhen (CN); Zhisheng Chen, Shenzhen (CN); Quan Shen, Shenzhen (CN)

(73) Assignee: AAC ACOUSTIC TECHNOLOGIES (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 16/524,208

(22) Filed: Jul. 29, 2019

(65) Prior Publication Data
US 2020/0045488 A1    Feb. 6, 2020

(30) Foreign Application Priority Data

Aug. 2, 2018  (CN) .......................... 2018 1 0873819

(51) Int. Cl.
*H04R 9/06*   (2006.01)
*H04R 1/02*   (2006.01)
(Continued)

(52) U.S. Cl.
CPC ........... *H04R 31/006* (2013.01); *B23K 26/21* (2015.10); *H04R 1/026* (2013.01); *H04R 1/2811* (2013.01);
(Continued)

(58) Field of Classification Search
CPC .. B23K 26/21; B23K 2103/54; B23K 26/402; C03B 23/245; H04R 1/02; H04R 1/025; H04R 1/026; H04R 1/2811; H04R 1/2888; H04R 9/06; H04R 9/045; H04R 31/00; H04R 31/006; H04R 2499/11
See application file for complete search history.

(56) References Cited

U.S. PATENT DOCUMENTS

| 9,125,298 B2 * | 9/2015 | Russell-Clarke ..... C03B 23/245 |
| 9,787,345 B2 * | 10/2017 | Ames .................... B23K 26/10 |
| 2015/0010175 A1 * | 1/2015 | Porter .................... H04R 9/025 381/164 |

FOREIGN PATENT DOCUMENTS

| CN | 102884015 A1 | 1/2013 |
| CN | 105101036 B2 | 8/2018 |

OTHER PUBLICATIONS

1st Office Action dated Dec. 25, 2019 by SIPO in related Chinese Patent Application No. 201810873819.7 (22 Pages).

* cited by examiner

*Primary Examiner* — Brian Ensey
(74) *Attorney, Agent, or Firm* — W&G Law Group LLP

(57) ABSTRACT

The present disclosure provides a sound device, comprising a housing and a sound unit received in the housing, wherein, the housing comprises an upper cover plate with a receiving space, the upper cover plate is made of 3D glass, and the upper cover plate and the sound unit are fixed to each other by laser welding. The sound device provided by the present disclosure replacing the housing with a 3D glass housing, and thus enhances the strength of the housing, and the sealing and fixing is implemented by laser welding due to the transparent property of the 3D glass, which effectively prevents overflowing caused by gluing and ultrasonic welding, meanwhile the maximum cavity is ensured and the usage of the antenna will not be affected.

2 Claims, 6 Drawing Sheets

(51) Int. Cl.
*H04R 31/00* (2006.01)
*H04R 9/04* (2006.01)
*B23K 26/21* (2014.01)
*H04R 1/28* (2006.01)

(52) U.S. Cl.
CPC ............... *H04R 9/045* (2013.01); *H04R 9/06* (2013.01); *H04R 2499/11* (2013.01)

SOUND DEVICE AND ASSEMBLING METHOD THEREFOR

TECHNICAL FIELD

The present disclosure relates to the field of electro-acoustic conversion technology, and in particular, to a sound device and an assembling method therefor.

BACKGROUND

Recently, information technology develops rapidly, and audio equipment have become more popular. User's demand for audio equipment is not limited to playback of videos and audios, but there is also a demand for improving reliability of audio equipment. As 5G times is coming, mobile multimedia technology is developed, and many audio equipment have a variety of entertainment functions, such as video playback, digital photography, games, GPS navigation, etc. As the demand for functions increases, the integrity of the elements and devices built within the audio apparatuses becomes higher and the requirement for high quality of products becomes stricter.

In audio equipment, a sound device is a commonly used electronic device, it is mainly used for audio signal playback, and the structural design thereof directly affects the quality of audio playback. A sound device according to the related art includes a housing with a housing space, and a sound unit received in the housing space.

In a sound device according to the related art, the housing is generally a plastic housing or a steel sheet is generally embedded in the plastic housing, so as to ensure the strength of the housing. However, the thickness of the plastic housing is limited to 0.50 mm or more generally, which makes the housing space insufficient; besides, the steel sheet cannot be used in a large area due to the influence of the antenna.

Therefore, it is necessary to provide a new sound device to solve the above technical problems.

BRIEF DESCRIPTION OF THE DRAWINGS

In order to more clearly describe the technical solutions in the embodiments of the present disclosure, the drawings used in the description of the embodiments will be briefly described below. It is obvious that the drawings in the following description only relate to some embodiments of the present disclosure. For those skilled in the art, other drawings may also be obtained according to the accompanying drawings without any creative work, wherein.

DETAILED DESCRIPTION

The technical solutions in the embodiments of the present disclosure are clearly and completely described in the following with reference to the accompanying drawings in the embodiments of the present disclosure. It is obvious that the described embodiments are only a part of the embodiments of the present disclosure, but not all of the embodiments. All other embodiments, obtained by a person of ordinary skill in the art based on the embodiments of the present disclosure without creative work, fall within the scope of the present disclosure.

Figure 1:
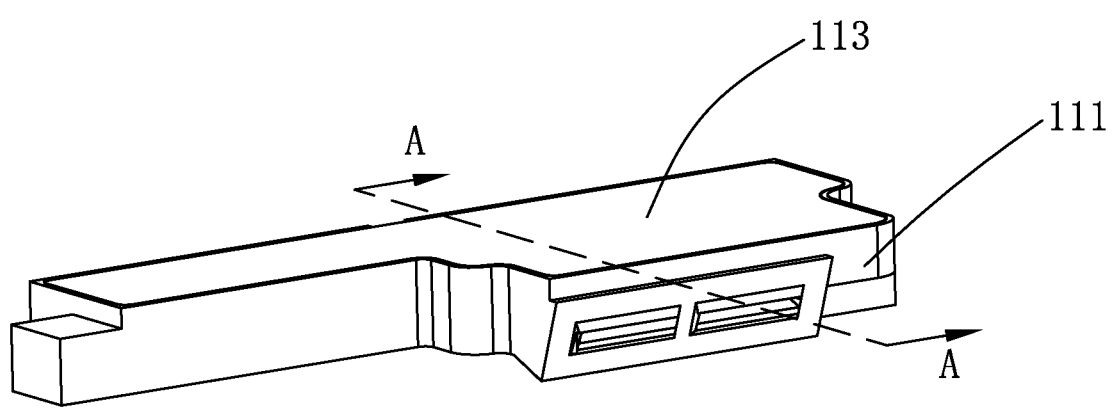
FIG. 1 is a perspective assembled view of a sound device provided by the present disclosure.
Figure 2:
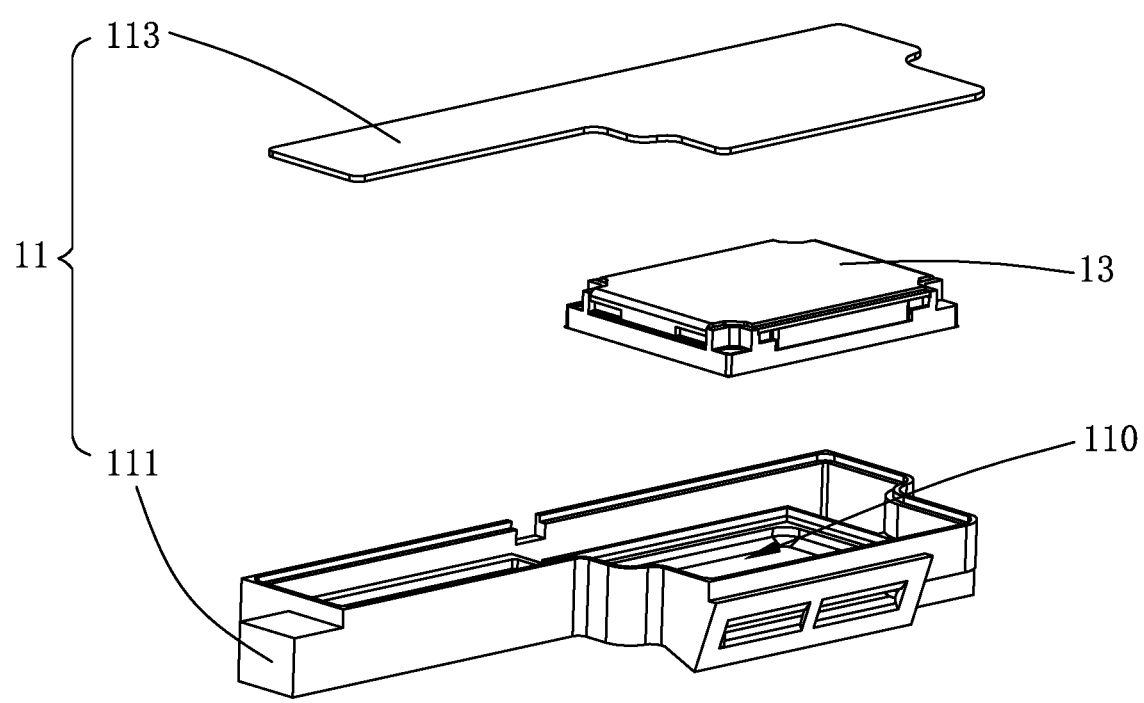
FIG. 2 is a perspective exploded view of the sound device as shown in FIG. 1.
Figure 3:
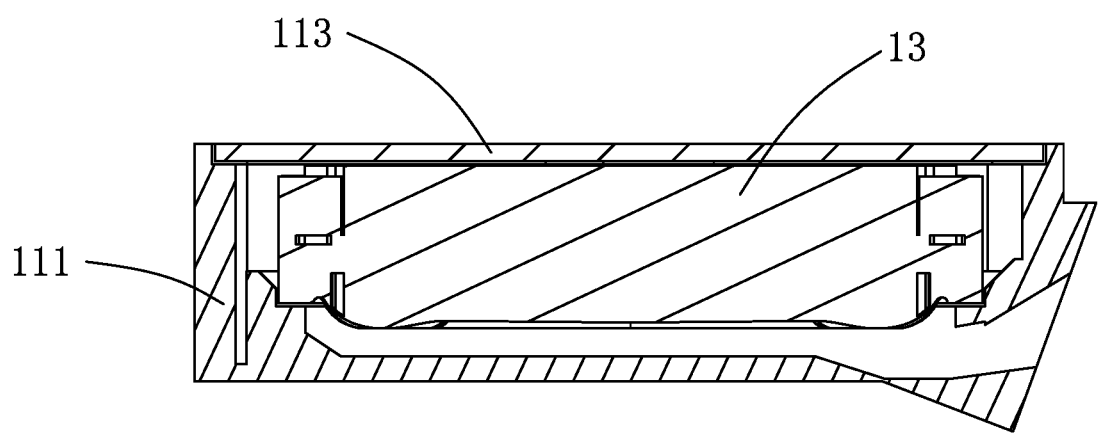
FIG. 3 is a cross-sectional view of the sound device as shown in FIG. 1 taken along line A-A.

Please refer to FIG. 1 to FIG. 3, FIG. 1 is a perspective assembled view of a sound device provided by the present disclosure; FIG. 2 is a perspective exploded view of the sound device as shown in FIG. 1; FIG. 3 is a cross-sectional view of the sound device as shown in FIG. 1, taken along line A-A. The present disclosure provides a sound device 1 including a housing 11 and a sound unit 13 received in the housing 11.

The housing 11 includes an upper cover plate 111 having a receiving space 110 and a lower cover plate 113 fitting with the upper cover plate 111. The sound unit 13 is received in the receiving space 110. Both the upper cover plate 111 and the lower cover plate 113 are made of 3D glass, that is, the housing 11 is a 3D glass housing, and the upper cover plate 111 and the sound unit 13 are fixed to each other by laser welding, and the upper cover plate 111 and lower cover plate 113 are also fixed to each other by laser welding.

Specifically, the 3D glass is a glass product with non-equal wall thickness processed by hot bending-molding, and it has a curvature and transparent property. When assembling with the sound unit 13, a certain area is selectively heated by using energy of laser. The laser may pass though the 3D glass, and a focus length of the laser may be adjusted such that the focus of the laser overlap with a step surface of a diaphragm of the sound unit 13, and the energy of the laser may be adjusted, so that the 3D glass contacted with the sound unit 13 is melt by heating, thereby forming a sealing and fixing ring, and thus the process of fixing and sealing between the above upper cover plate 111 and the sound unit 13 is completed, which effectively prevents overflowing caused by gluing and ultrasonic welding. The strength of 3D glass is better, and thus it is easy to use a thin-wall thickness molding (0.30 mm or less) technology, so that phenomenons such as shell vibration would not be presented inside the cavity of the housing 11. In addition, as 3D glass is a kind of non-metallic material, the usage of the antenna will not be affected.

The sound unit 13 is provided with a casing, and the casing may be a plastic casing.

Figure 4:
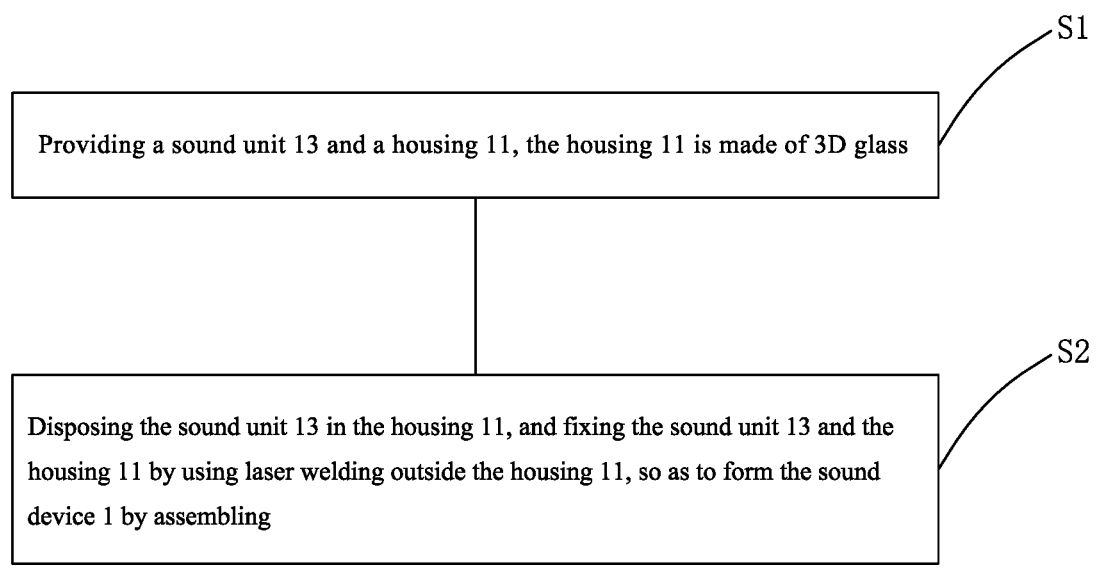
FIG. 4 is a flow chart of an assembling method for the sound device as shown in FIG. 1.

Please refer to FIG. 4, FIG. 4 low chart of an assembling method for the sound device as shown in FIG. 1. The present disclosure also provides an assembling method for a sound device, which comprises the following steps:

Step S1, providing the sound unit 13 and the housing 11, the housing 11 is made of 3D glass;

Step S2, disposing the sound unit 13 within the housing 11, and fixing the sound unit 13 and the housing 11 with each other by using laser welding outside the housing 11, so as to form the sound device 1 by assembling.

Figure 5:
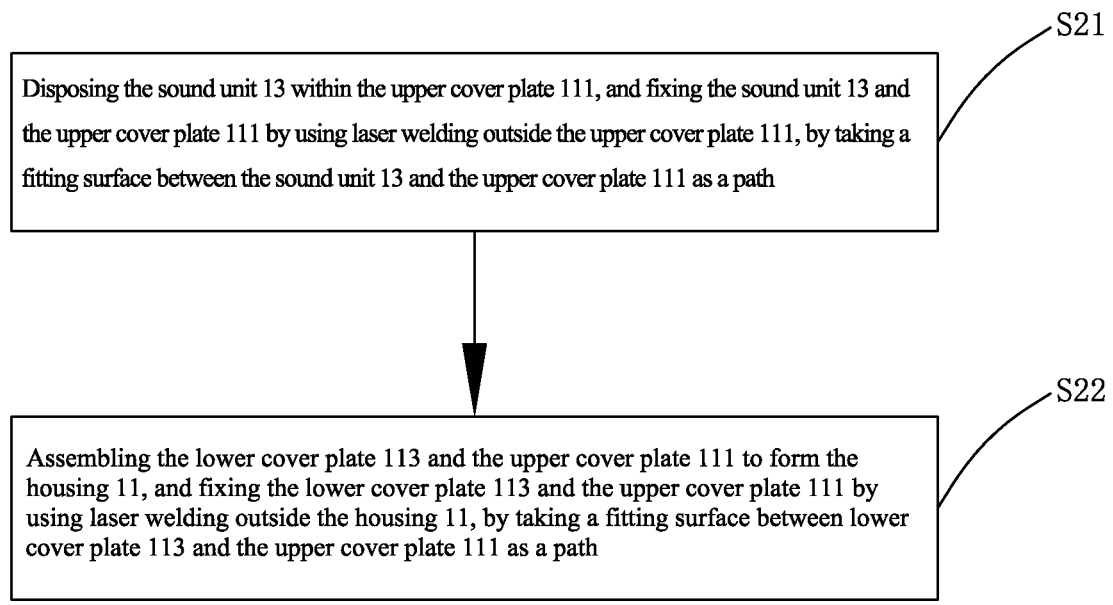
FIG. 5 is a schematic flow chart illustrating the step S2 in the assembling method for the sound device as shown in FIG. 4.

Please refer to FIG. 5, FIG. 5 is a schematic flow chart showing step S2 in the assembling method for the sound device as shown in FIG. 4. Specifically, in step S2, the assembling step for the sound unit 13 and the housing 11 includes:

Step S21, disposing the sound unit 13 within the upper cover plate 111, and fixing the sound unit 13 and the upper cover plate 111 with each other by using laser welding outside the upper cover plate 111, by taking a fitting surface between the sound unit 13 and the upper cover plate 111 as a path.

Figure 6:
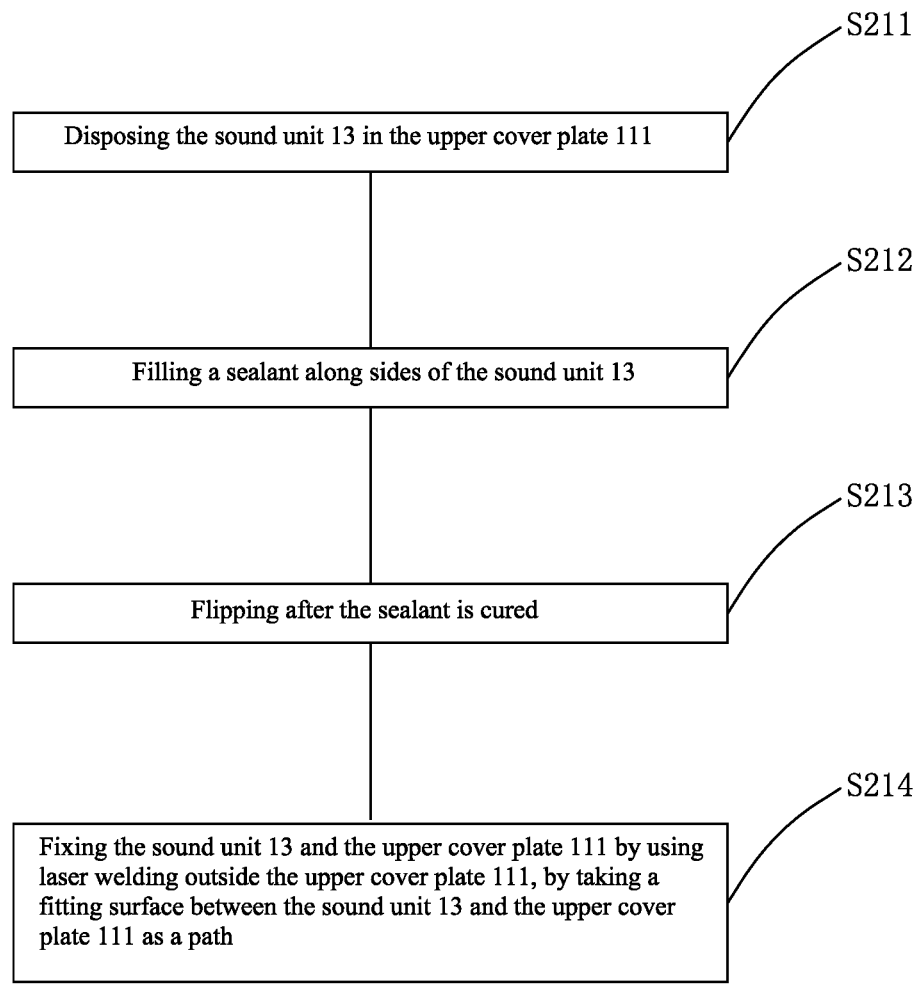
FIG. 6 is a schematic flow chart illustrating the step S21 in the step S2 as shown in FIG. 5.

Please refer to FIG. 6, FIG. 6 is a schematic flow chart illustrating the step S21 in the step S2 as shown in FIG. 5, the assembling step for the sound unit 13 and the upper cover plate 111 includes:

Step S211, disposing the sound unit 13 in the upper cover plate 111;

Step S212, filling a sealant along sides of the sound unit 13;

Step S213, flipping after the sealant is cured; and

Step S214, fixing the sound unit 13 and the upper cover plate 111 with each other by using laser welding outside the upper cover plate 111, by taking a fitting surface between the sound unit 13 and the upper cover plate 111 as a path.

Step S22, assembling the lower cover plate 113 and the upper cover plate 111 to form the housing 11, and fixing the lower cover plate 113 and the upper cover plate 111 with each other by using laser welding outside the housing 11, by taking a fitting surface between lower cover plate 113 and the upper cover plate 111 as a path.

The above description only illustrates the embodiments of the present disclosure. It should be noted that those skilled in the art may make improvements thereto without departing from the inventive concept of the present disclosure, which shall be considered as falling within the protection scope of the present disclosure.

The invention claimed is:

1. An assembling method for a sound device, comprising the steps of:
   providing a sound unit and a housing, the housing is made of 3D glass; and
   disposing the sound unit in the housing, and fixing the sound unit and the housing with each other by using laser welding outside the housing, so as to form a sound device by assembling;
   wherein the housing comprises an upper cover plate and a lower cover plate fitted with the upper cover plate, the step for fixing the sound unit and the housing comprises:
   disposing the sound unit within the upper cover plate, and fixing the sound unit with the upper cover plate with each other by using laser welding outside the upper cover plate, by taking a fitting surface between the sound unit and the upper cover plate as a path; and
   assembling the lower cover plate with the upper cover plate to form the housing, wherein, fixing the lower cover plate and the upper cover plate with each other by using laser welding outside the housing, by taking a fitting surface between lower cover plate and the upper cover plate as a path.

2. The assembling method for a sound device according to claim 1, wherein the step for fixing the sound unit and the upper cover comprises:
   disposing the sound unit within the upper cover;
   filling a sealant along sides of the sound unit;
   flipping after the sealant is cured; and
   fixing the sound unit and the upper cover plate with each other by using laser welding outside the upper cover plate, by taking a fitting surface between the sound unit and the upper cover plate as a path.

* * * * *